3,080,918
PETROLEUM RECOVERY FROM SUBSURFACE OIL BEARING FORMATION
Manley L. Natland, Rolling Hills, Calif., assignor to Richfield Oil Corporation, Los Angeles, Calif., a corporation of Delaware
Filed Aug. 29, 1957, Ser. No. 681,097
6 Claims. (Cl. 166—11)

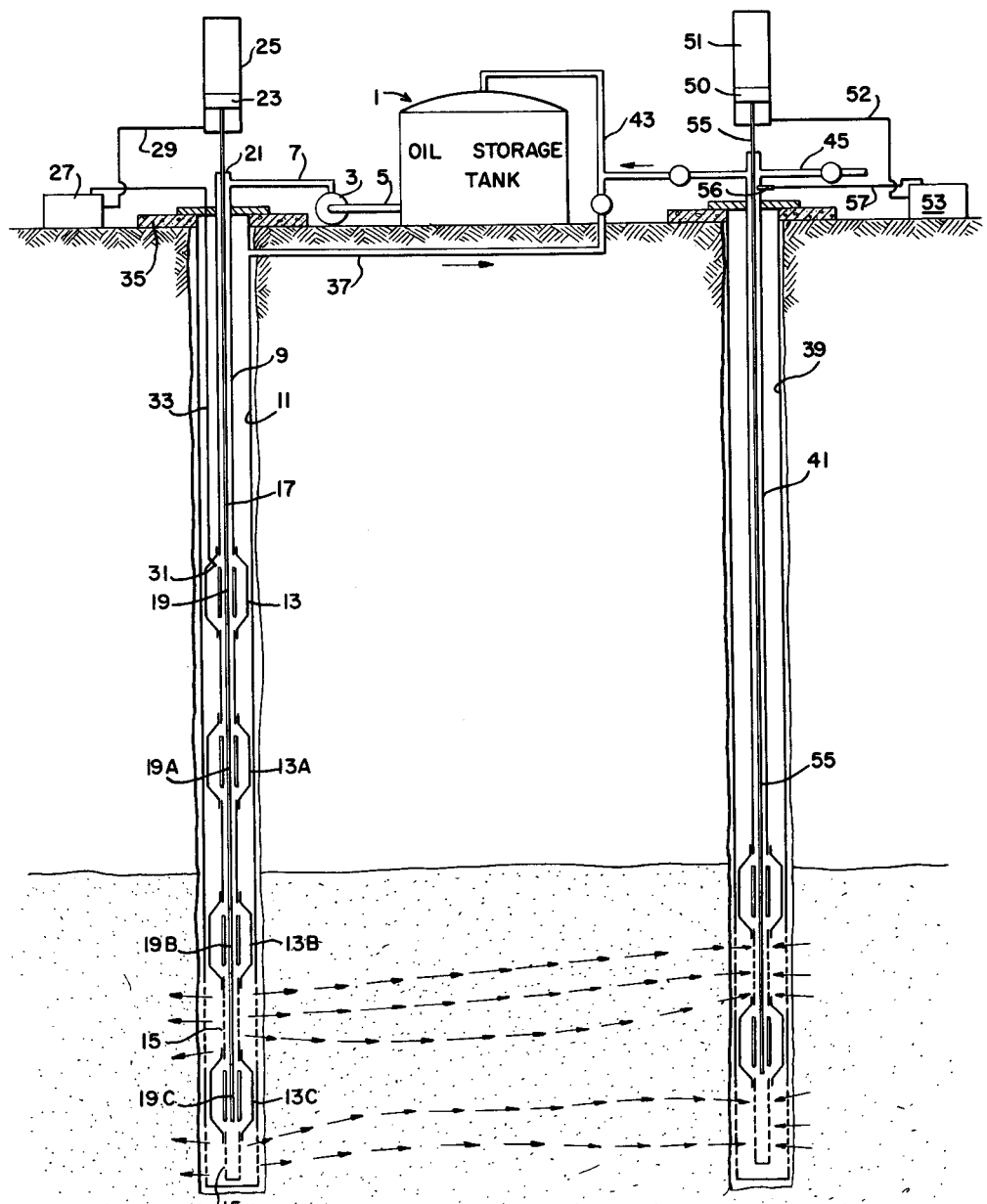

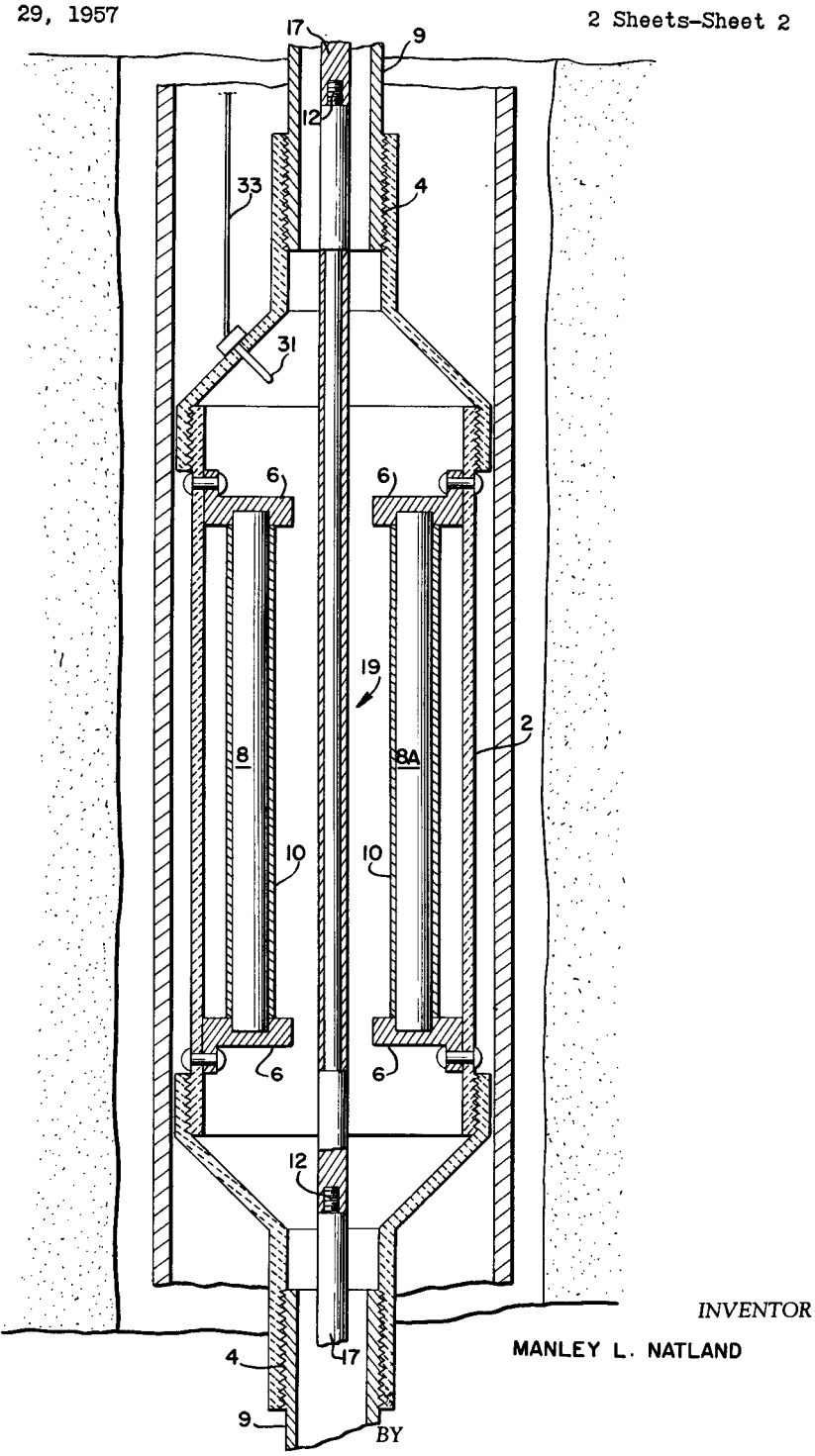

This invention pertains to a novel method of heating and rendering less viscous the oil contained in subsurface oil bearing formations and to apparatus useful in effecting the heating of such petroleums. More particularly, the present invention relates to the heating of petroleum by nuclear reactors using the petroleum both as a neutron, moderator for the reactor and as a coolant.

The present method comprises pumping petroleum contained in a reservoir at the earth's surface down a tubing string suspended in a well bore through one or more nuclear reactors thence outwardly into an oil bearing formation adjacent the well bore. The oil, during its passage through the reactors flows between the fissionable elements and thus comes into heat exchange relationship with the fissionable elements of the reactor to act as a reaction coolant while carrying away heat produced by the nuclear fission taking place within the nuclear reactor. The petroleum, heated in this manner, passes into the formation wherein it serves to heat and render less viscous the oil contained therein. The petroleum introduced into the formation and at least a portion of that originally in the formation can be forced or driven by the injected oil to an output well in which can also be suspended, if desired, a tubing string having similar nuclear reactors for heating the recovered oil and reducing its viscosity to facilitate transportation to the earth's surface. The oil recovered from the output well can be directed to the reservoir tank for recirculation back through the input well and the formation of all or a portion of it can be drawn off for further refinery processing. The petroleum, as hereinafter explained in more detail, serves not only as a coolant for the reactor but also as a moderator to slow the neutrons in the reaction system down to their thermal velocities.

The above described method and the apparatus for effecting the method can best be defined by reference to the following figures wherein:

FIGURE I is a diagrammatic view partially in cross section of an apparatus for effecting the present method; and FIGURE II is an enlarged cross sectional view of one of the nuclear reactors of FIGURE I.

The apparatus for effecting the present method of heating the oil bearing subsurface formation and recovering oil therefrom comprises an oil storage tank 1 located at the earth's surface, pumping means 3 and lines 5 and 7, respectively, connecting the tank 1 to pump 3 and pump 3 to tubing string 9, extending into the cased input bore hole 11. Tubing string 9 has affixed therein at spaced intervals nuclear reactors 13, 13A, 13B and 13C. It is to be understood that one or any number or similar nuclear reactors can be used, the number depending upon the intensity of the fission reaction and the temperature to which the petroleum is to be heated. Generally, at least one of the reactors is in the vicinity of an oil bearing formation adjacent the well bore, for instance a tar sand having oil of about 5 to 15° API gravity. At the lowermost end of tubing string 9 opposite the oil bearing strata, are provided perforations 15 for the emission of the heated petroleum from the string 9. Similar perforations are provided in the adjacent bore hole casing. Extending the length of tubing string 9 to the lowermost nuclear reactor is a movable control rod 17.

Rod 17 has affixed thereto neutron absorbing portions 19, 19A, 19B, and 19C. Neutron absorbing portions 19 are spaced along the rod 17 in such a manner that each of the neutron absorbers will extend substantially the length of the respective neutronic reactors. Rod 17 extends through packing gland 21 at the top of tubing string 9 and is attached by any suitable means to piston 23 operating within cylinder 25. Piston 23 is activated by pump means 27 through a fluid medium transmitted by way of line 29. At any suitable location within nuclear reaction chamber 13 is located a thermocouple within thermowell 31. The thermocouple is in electrical communication with a temperature control device (not shown) by means of cable 33. The temperature control device is attached to a solenoid or similar device within pump means 27 which in turn serves to automatically activate pump 27 in response to the temperature in reactor 13 which operates piston 23 thereby raising or lowering rod 17 and the absorbing portions 19 into or out of the reaction chambers 13. The controlling thermocouple could, of course, be associated with any of the reactors in tubing string 9. The bore hole can be suitably sealed as by a concrete and steel cap 35. Provided at the top of the bore hole casing 11 is return pipe 37 leading back to the storage tank 1 which permits the heated oil to return to the surface without passing through the adjacent formation when such flow is desired.

Located at spaced intervals around the input bore hole 11 there is provided one or more cased output bore holes 39. The output bore hole can be provided with the same arrangement of tubing string, nuclear reactors, control rods, etc. as described above with the exception of the lines leading from the tubing string. The oil brought to the surface by way of tubing string 41 can be returned to the storage tank 1 through line 43 or it can be drawn off as production by line 45. These heaters serve to lower the viscosity of the oil recovered from the adjacent formation and can add sufficient energy to the oil stream to lift it to the surface without employing a pumping means. Of course, the heated oil can be recovered by pumping or other means.

At the top of the output well, piston 50 in cylinder 51, and rod 55 are lifted by fluid entering the cylinder through line 52 from pump 53. This pump can be controlled by a thermocouple in thermowell 56 leading into tubing string 41 and operatively associated with pump 53 by conductor 57. It is, of course, not necessary to provide the output bore with this arrangement of nuclear reactors and tubing string as they can be omtited entirely and the oil recovered by the usual pumping or lifting methods if its viscosity permits.

In FIGURE II, I have shown and will hereinafter describe the nuclear reactors which find particular utility in carrying out the present method of heating subsurface petroleum deposits. Generally neutronic reactors are classified as fast or slow, heterogeneous or homogeneous, depending upon the type of neutrons utilized in effecting the fission and the method of introducing the fissionable material into the system. The type of reactor contemplated in the present invention and shown in detail in FIGURE II is of the heterogeneous, slow or thermal neutron type. By this is meant that the fission of the reactive isotopes is caused by slow or thermal neutrons and the fissionable fuel is introduced into the system as solid slugs or bodies rather than in a slurry as in the homogeneous system. In reactors of this type, the thermalization of the high velocity fission neutrons is usually accomplished by providing a material in the system which will act as a buffer upon which the high velocity neutrons will expend some of their energies yet will not be captured or absorbed, thereby. In other words, high energy level neutrons when contacting the nucleus of the buffering or moderating material will rebound in an elastic manner thus losing part of their energy or velocity with the collision but yet the nature of the moderating nuclei is such that it will not retain the neutron within its sphere. In the past various materials such as beryllium, graphite, deuterium, water and heavy water have been used for this purpose. When the fission neutrons have reached the thermal energy of the particular system they will be absorbed by the fissionable isotope nuclei present resulting in the fission of the nuclei with a production of about two additional fission or high energy level neutrons and heat energy. Thus, it can be seen that due to this neutron reproduction factor of about two for every neutron used in causing fission a chain reaction can be established. In order to control the chain reaction, however, this neutron reproduction factor must be maintained at about unity or slightly above since due to the exponential increase in neutron densities a reaction could result of increasing magnitude until such time as an explosion occurs or the increased heat generated by the increasing rate of fission destroys the geometry of the system. The control of the neutron reproduction factor is generally accomplished by introducing into the reactor a material which will poison the system or absorb the excess neutrons present. Such a material is termed a neutron inhibitor or absorber. Usually boron or cadmium shaped in the form of movable rods for insertion or withdrawal from the interior of the reactor are provided to accomplish this purpose. As mentioned above each nuclear fission produces large amounts of energy in the form of heat. This heat tends to build up in the fissionable elements and reactive core and if left to accumulate can result in the destruction of the geometry of the system and the deterioration of the chain reaction. It has therefore been found advantageous to provide some means to remove all or a part of the heat thus formed from the system. In order to accomplish this heat removal various coolant fluids such as air, water, liquid sodium, mercury, etc. have been passed in heat exchange relationship through the interior of the reactor and around the fissionable elements.

In accordance with the present invention I have provided a nuclear reactor of the general type described above wherein both the moderation of the high energy level neutrons and the cooling of the reactive system is accomplished by the circulation of a liquid petroleum oil through the nuclear reactor. As the petroleum passes through the nuclear reactor the high energy level fission neutrons are moderated to thermal energies by contact with the organic nuclei of the petroleum and the petroleum serves to absorb part of the heat of the fission reaction thus cooling the reactor and raising the temperature of the petroleum rendering it less viscous and more easily pumpable. The rate of fission and ultimately the temperature of the circulating petroleum can be regulated by the insertion or withdrawal of neutron absorbing rods from the interior of the reactive core.

Referring now to FIGURE II, I have shown a nuclear reactor which comprises a reactor casing 2 made of a suitable heat resistant ceramic or similar material. Preferably the reactor case 2 will have embedded therein a neutron reflecting material such as graphite or beryllium in amounts sufficient to reduce the possibilities of neutrons escaping from the system. Alternately, of course, a layer of graphite or beryllium could be placed on the inside or outside of the casing. The reactor case 2 is suitably held in position in tubing string 9 by means of threaded connections 4. As shown in FIGURE I, several similar reactors can be placed in the tubing string if desired. Within the reactor case 2 there are suspended and held in position by bracket means 6 affixed to the interior wall of the reactor case 2, cylindrical fissionable elements 8 and 8A. There can, of course, be more than two of these cylindrical elements if desired. The fissionable elements are contained in a protective cladding 10. This cladding 10 will normally be a non-corrosive metal such as aluminum or stainless steel to prevent contamination of the oil by the materials of rods 8 and 8A. Protruding within the interior of the reactor case through the casing 2 at any convenient location is thermowell 31 containing the thermocouple. Passing down the tubing string 9 through the interior of the reaction chamber is control rod 17 having affixed thereto neutron inhibiting portion 19. Control rod 17 as seen in FIGURE II can be constructed from a solid rod joined in segments by threads as at 12, the segments which are designed to extend through the length of the reaction chamber having a cladding 19 of a neutron absorbing material such as boron or cadmium thereon. The interior of the reactor is free from undue obstructions so that the petroleum pumped down tubing string 9 has an open access through the reactive case and around the fissionable elements 8 and 8A. The fissionable elements 8 and 8A can be composed of natural uranium sufficiently enriched with U235 to establish a chain reaction or they can be composed of one of the artificial fissional istotopes such as U233 or U239. The combined masses of the fissionable elements must be at least equal to the critical mass of the particular system with this mass being at least sufficient to produce temperatures up to about 1200° F., preferably about 400 to 800° F. An initial source of neutrons can be placed within the reactive case at any convenient location such as around the periphery of the reactor case.

In operation the petroleum in the subsurface formation is heated, rendered more fluid and forced to the output wells by reason of the heated petroleum which is pumped into the formation after its passage through the nuclear reactors in the input well. Once the tubing string having the nuclear reactors positioned therein has been placed within the well bore the petroleum contained in the storage tank is pumped down through the tubing string and reactors. In order to start the nuclear chain reaction it is only necessary to withdraw the neutron absorbing portion of the control rod from the reactors by forcing piston 23 upwardly. As the fission proceeds the heat generated will serve to raise the temperature of the petroleum passing therethrough. As the temperature of the reaction increases the temperature of the petroleum will be correspondingly increased thus rendering it less viscous and more easily pumpable. A sufficient pressure will be maintained on the petroleum flowing through the tubing string and reactors to force the heated petroleum through the perforations of the tubing string and the well casing into and through the surrounding formation. When more than the desired degree of heat is being produced the thermocouple located in the interior of the reactor will transmit the temperature to a temperature responsive device located at the pump means. The temperature responsive device activates a solenoid or similar device which will in turn activate the pump, withdrawing fluid from beneath the piston 23 thereby lowering the control rod and the neutron absorbers into the reaction chamber thus stopping or slowing down the chain reaction and lowering the temperature. When the temperature is below that desired the same pattern will be followed in activating the pump so as to raise piston 23 and raise the control rod from the reactive core and increase the rate of fission. In this manner the rate of fission and therefore the temperature can be controlled to any desired extent. The reactors in the output well can be similarly controlled by raising and lowering piston 50 in response to the oil temperature at the well head or temperature in the reactors as described with reference to the input well.

In the system as shown I have provided an auxiliary cooling circuit to be used in case of emergencies. Referring again to FIGURE I, I have provided a pipe 37 connecting the annulus formed by the tubing string 9 with the well casing 11. The pipe 37 leads to oil storage tank 1 and has a valve 39 connected therein. If the temperature of the reactors increases to an undesirable extent the petroleum flowing therethrough can be routed back up the annulus thus producing an additional cooling flow of liquid around the exterior of the reactor.

I claim:
1. In a method for heating and rendering less viscous the petroleum contained in a subsurface oil bearing formation, the steps which comprise providing input and output bore holes to said formation, positioning in said input bore hole means for effecting a controlled self-sustained thermal neutronic reaction, said means having spaced apart fissionable elements, passing crude petroleum oil between said fissionable elements whereby said oil is heated while serving as a neutron moderator, passing said heated oil into the said formation thus rendering the petroleum contained in said formation less viscous and recovering oil from the formation by means of said output bore hole.

2. In a method for heating and rendering less viscous the petroleum contained in a subsurface oil bearing formation, the steps which comprise providing input and output bore holes to said formation, positioning in said input and output bore holes means for effecting controlled self-sustained thermal neutronic reactions, said means having spaced apart fissionable elements, passing crude petroleum oil between said fissionable elements in said reaction means in said input bore hole whereby said oil is heated while serving as a neutronic moderator, passing said heated oil into the said formation thus rendering the petroleum contained in said formation less viscous and recovering oil from said formation into said output bore hole, passing the thus recovered oil between said fissionable elements in said reaction means in said output bore hole whereby the oil is heated while serving as a neutron moderator and passing recovered oil to the earth's surface.

3. An apparatus useful in the recovery of oil from a subsurface formation communicating with the earth's surface by input and output bore holes which comprises a self-sustained thermal neutronic reactor positioned in said input bore hole means for effecting a controlled self-sustained thermal neutronic reaction in said reactor, said reaction means including spaced apart fissionable elements in said reactor, means for passing crude petroleum oil from the earth's surface through said reactor and between said fissionable elements to heat said oil while serving as a neutron moderator, means to pass the heated oil to the adjacent oil bearing formation and means operable from the earth's surface for controlling the extent of nuclear reaction in said reactor.

4. An apparatus useful in the recovery of oil from a subsurface formation communicating with the earth's surface by input and output bore holes which comprises a self-sustained thermal neutronic reactor positioned in said input bore hole means for effecting a controlled self-sustained thermal neutronic reaction in said reactor, said reaction means including spaced apart fissionable elements in said reactor, means for passing crude petroleum oil from the earth's surface through said reactor and between said fissionable elements to heat said oil while serving as a neutron moderator, means to pass the heated oil to the adjacent oil bearing formation and means operable from the earth's surface for controlling the extent of nuclear reaction in said reactor, said reaction controlling means including a neutron absorbing member and means for inserting and withdrawing said absorbing member into and out of the neutronic reactor.

5. An apparatus useful in the recovery of oil from a subsurface formation communicating with the earth's surface by input and output bore holes which comprises a self-sustained thermal neutronic reactor positioned in said input bore hole means for effecting a controlled self-sustained thermal neutronic reaction in said reactor, spaced apart fissionable elements in said reactor, means for passing crude petroleum oil from the earth's surface through said reactor and between said fissionable elements to heat said oil while serving as a neutron moderator, means to pass the petroleum from said input bore hole to the reactor positioned in said output bore hole and means operable from the earth's surface for controlling the extent of nuclear reaction in said reactor.

6. An apparatus useful in the recovery of oil from a subsurface formation communicating with the earth's surface by input and output bore holes which comprises a self-sustained thermal neutronic reactor positioned in said input bore hole means for effecting a controlled self-sustained thermal neutronic reaction in said reactor, spaced apart fissionable elements in said reactor, means for passing crude petroleum oil from the earth's surface through said reactor and between said fissionable elements to heat said oil while serving as a neutron moderator, means to pass the petroleum from the reactor positioned in said input bore hole to said output bore hole and means operable from the earth's surface for controlling the extent of nuclear reaction in said reactor, said reaction controlling means including a neutron absorbing member and means for inserting and withdrawing said absorbing member into and out of the neutronic reactor.

References Cited in the file of this patent

UNITED STATES PATENTS

| | | |
|---|---|---|
| 2,584,605 | Merrian | Feb. 5, 1952 |
| 2,630,307 | Martin | Mar. 3, 1953 |
| 2,670,802 | Ackley | Mar. 2, 1954 |
| 2,675,081 | Nowak | Apr. 13, 1954 |
| 2,708,656 | Fermi | May 17, 1955 |
| 2,743,224 | Ohlinger | Apr. 24, 1956 |

FOREIGN PATENTS

| | | |
|---|---|---|
| 1,147,517 | France | June 11, 1957 |
| 56,383 | France | July 16, 1952 |
| (First addition to Patent No. 999,330) | | |

OTHER REFERENCES

TID 5275 Research Reactors pp. 311–318.

UNITED STATES PATENT OFFICE
CERTIFICATE OF CORRECTION

Patent No. 3,080,918                                    March 12, 1963

Manley L. Natland

It is hereby certified that error appears in the above numbered patent requiring correction and that the said Letters Patent should read as corrected below.

Column 5, line 23, for "positionlng" read -- positioning --; same column 5, lines 42 and 56, and column 6, lines 14 and 28, after "bore hole", each occurrence, insert a comma; column 6, line 20, after "from" insert -- the reactor positioned in --.

Signed and sealed this 5th day of November 1963.

(SEAL)
Attest:

ERNEST W. SWIDER
Attesting Officer

EDWIN L. REYNOLDS
Acting Commissioner of Patents